Oct. 15, 1968           R. I. HOMIER           3,405,902
MULTIPLE WEDGE SEAT ADJUSTER
Filed Feb. 23, 1966           2 Sheets-Sheet 1
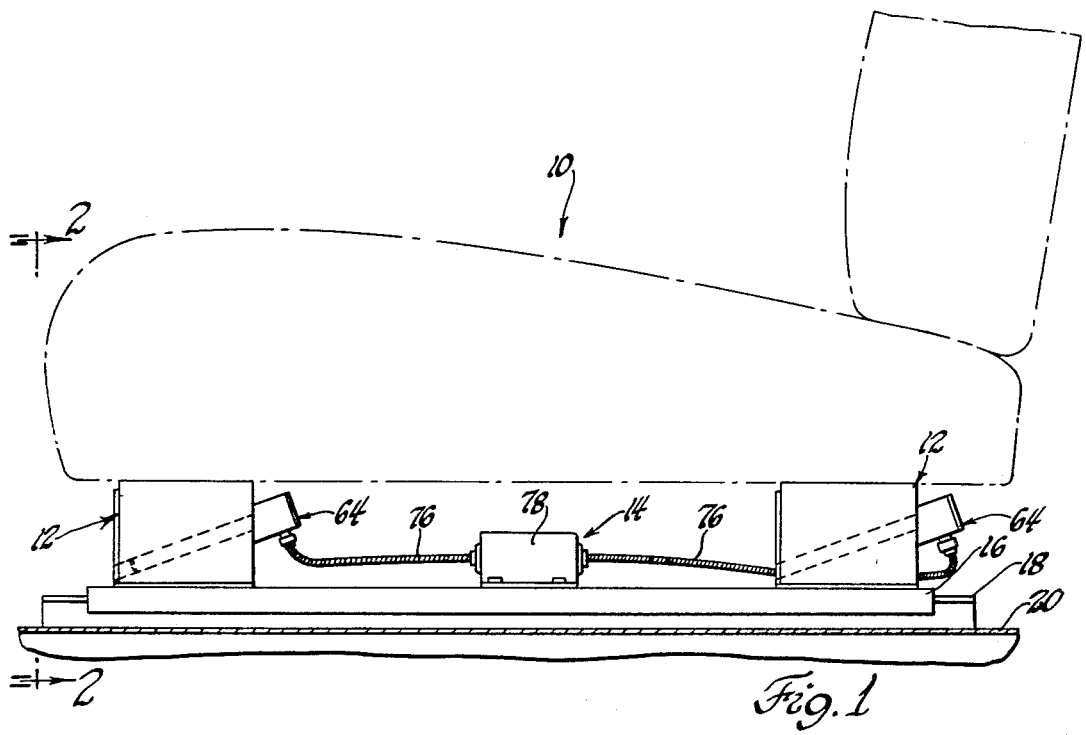
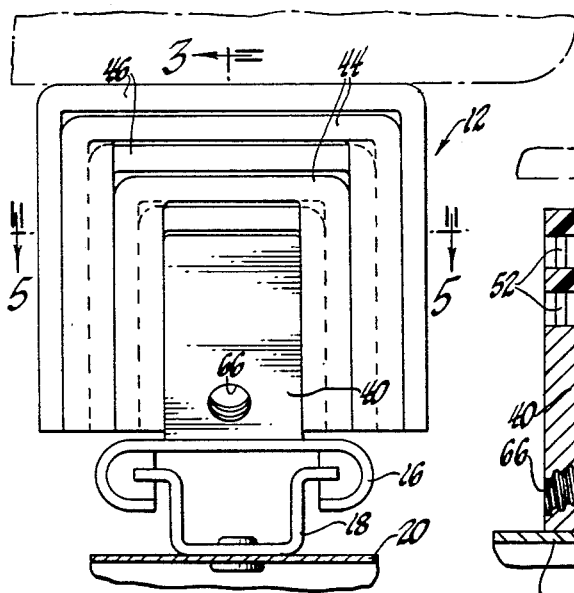
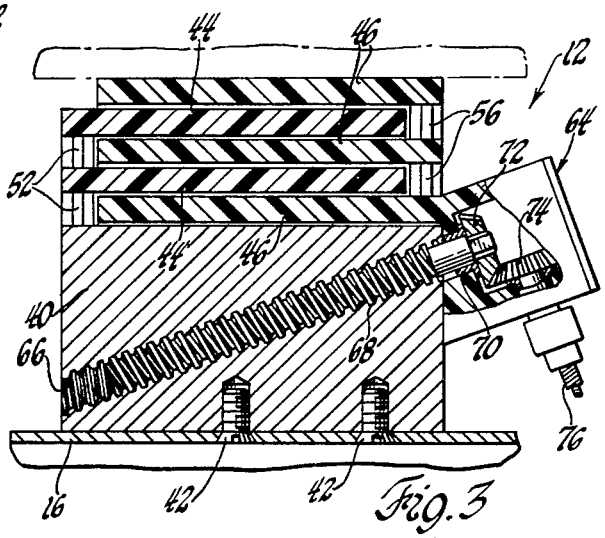
INVENTOR.
Robert I. Homier
BY
Barnard, McGlynn & Reising
ATTORNEYS

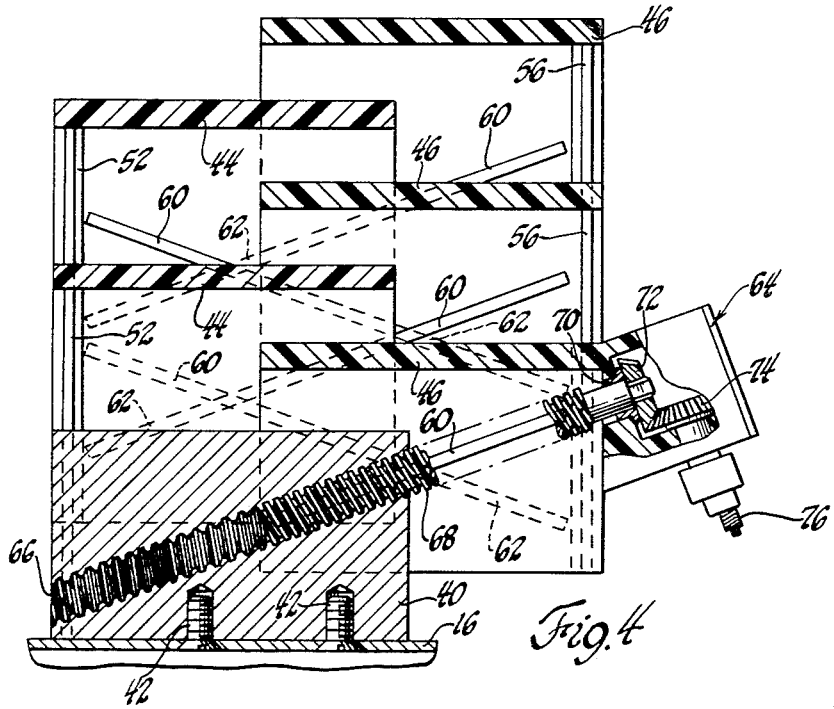
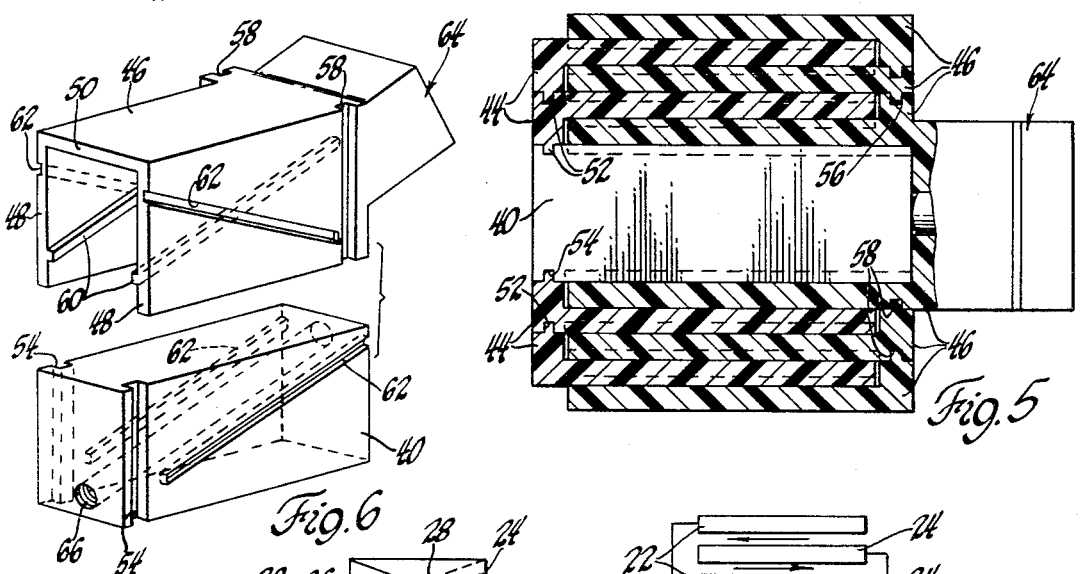
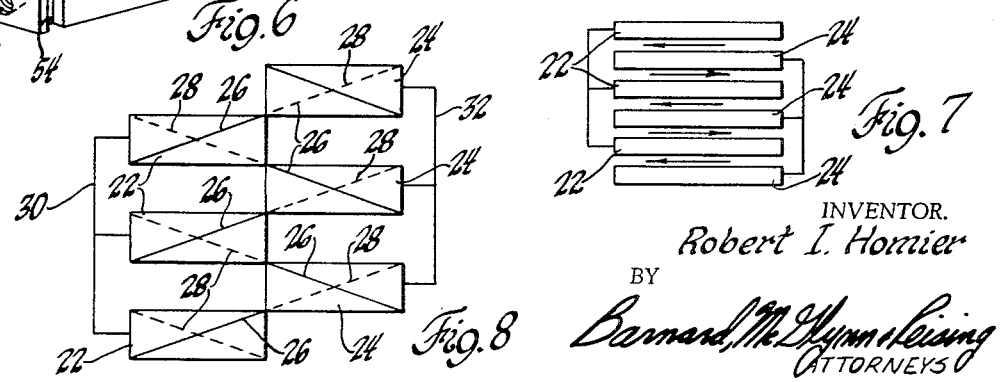

United States Patent Office 3,405,902
Patented Oct. 15, 1968

3,405,902
MULTIPLE WEDGE SEAT ADJUSTER
Robert I. Homier, Farmington, Mich., assignor, by mesne assignments, to Lear Siegler, Inc., Santa Monica, Calif., a corporation of Delaware
Filed Feb. 23, 1966, Ser. No. 529,313
21 Claims. (Cl. 248—419)

ABSTRACT OF THE DISCLOSURE

A seat assembly having a plurality of mechanisms for adjusting the position of the seat and wherein each mechanism includes a plurality of first members, a plurality of second members, and means interconnecting the first and second members for increasing the vertical distance occupied by the members to move the seat vertically upon movement in a second direction of one of the first members relative to at least one of the second members.

---

Adjustable seat assemblies of the type to which the instant invention pertains normally include a seat supported in a vehicle by adjustment mechanisms so that the front and rear portions of the seat may be raised or lowered independently of the other to adjust the position of the seat. Seat assemblies heretofore utilized usually include complex linkage systems or jack mechanisms which are expensive to manufacture, and difficult to maintain. In addition, most mechanisms heretofore utilized for adjusting the position of a seat occupy a significantly large amount of vertical space between the seat and the support structure to which the seat is attached, such as the floor of an automobile, or the like.

Accordingly, it is an object and feature of this invention to set forth a mechanism which is particularly adaptable for adjusting the position of a seat and which is simple to manufacture and maintain and occupies a very minimum of vertical space beneath the seat, yet provides a large range of vertical adjustment for the seat.

Another object and feature of this invention is to provide a mechanism for adjusting the position of a seat which includes a plurality of first members, a plurality of second members, and means preventing relative rotation between and interconnecting the members for increasing the accumulated vertical distance across the members to adjust the position of the seat upon relative movement in a horizontal direction of one of the first members relative to at least one of the second members.

In general, these and other objects and features of this invention may be attained by a seat assembly including a plurality of mechanisms each of which includes a central member, a plurality of first members, and a plurality of second members. Each of the first and second members comprises a pair of legs and a base portion to form a U shape. The U-shaped members fit one within another with the innermost second U-shaped member disposed about the central member. The respective legs of each of the first and second members coact with the next adjacent legs through flanges and grooves. That is, each leg has a flange on one side thereof and a groove on the other side thereof for coacting with the flange or groove of the next adjacent legs. The flange and groove on opposite sides of each leg member are disposed in crossed relationship. The first and second U-shaped members are alternately disposed so that the innermost second U-shaped member is disposed about and coacts with the central member by flanges and grooves and a first member is disposed about the innermost second member and coacts therewith by flanges and grooves, and so on. The central member and the first members are interconnected by flanges and recesses disposed substantially vertically so that the central member and the first members may move relative to one another vertically but are prevented from moving relative to one another horizontally. Likewise, the second members are interconnected by substantially vertical flanges and recesses so that they may move vertically relative to one another but are prevented from moving horizontally relative to one another. A drive means operatively interconnects the central member and the innermost second member, which is disposed immediately about the central member, so that when the innermost second member is moved rectilinearly or horizontally relative to the central member, the distances between base portions of adjacent U-shaped members increases to increase the vertical distance across the entire mechanism.

Other objects and attendant advantages of this invention will be readily appreciated as the same becomes better understood by reference to the following detailed description when considered in connection with the accompanying drawings wherein:

FIGURE 1 is a side elevational environmental view showing a preferred embodiment of a seat assembly constructed in accordance with the instant invention;

FIGURE 2 is an enlarged fragmentary cross-sectional view taken substantially along line 2—2 of FIGURE 1;

FIGURE 3 is a cross-sectional view partially broken away and taken substantially along line 3—3 of FIGURE 2;

FIGURE 4 is a cross-sectional view similar to FIGURE 3 but showing the mechanism in an expanded position;

FIGURE 5 is a cross-sectional view taken substantially along line 5—5 of FIGURE 2;

FIGURE 6 is an exploded perspective view of two components of the seat adjusting mechanism of the instant invention;

FIGURE 7 is a schematic plan view of a seat adjusting mechanism constructed in accordance with the instant invention; and FIGURE 8 is a schematic elevational view of a seat adjusting mechanism constructed in accordance with the instant invention and in the expanded position.

Referring now to the drawings, wherein like numerals indicate like or corresponding parts throughout the several views, a seat assembly constructed in accordance with the instant invention is generally shown at 10 in FIGURE 1. The seat assembly 10 includes a plurality of mechanisms, each of which is generally shown at 12, for adjusting the position of the seat, and a drive means, generally shown at 14, for operating the respective mechanisms 12. The mechanisms 12 are attached to a slide member 16 which slides relative to a support member 18 for adjusting the fore and aft position of the seat. The support member 18 is secured to a support structure 20, such as the floor, or the like, of an automobile.

The structural details of the mechanism 12 will be more readily understood by first referring to the schematic illustrations of FIGURES 7 and 8. FIGURE 7 schematically represents a plan view of a unit comprising a plurality of first members 22 and a plurality of second members 24 and FIGURE 8 schematically represents an elevational view showing the components of FIGURE 7 in the expanded position. Each of the first members 22 coacts with the next adjacent second member 24 through flanges 26 and grooves 28, the flange being on one member and the groove being on the adjacent member. The flanges 26 and the coacting grooves 28 are disposed diagonally across the respective members 22 and 24, and the arrowheads in FIGURE 7 represent the lower end of each flange and coacting groove disposed between adjacent members 22 and 24. There is also included a first connection means 30 for interconnecting the first plurality of members 22 to allow the members 22 to move relative to one another vertically but preventing relative movement between the members 22 in a horizontal direction. Likewise, a connection means 32 interconnects the second members 24 to allow the second members 24 to move vertically relative to one another but prevents relative movement between the second members 24 in a horizontal direction. It will be noted that each of the respective members 22 and 24 has a flange on one side thereof and a groove on the opposite side thereof and that the groove and the flange on each respective member are disposed in a crossed relationship relative to one another. Thus, by moving the lowermost members 22 and 24 illustrated in FIGURE 8 apart in a horizontal direction, the members expand to increase the accumulated vertical distance across the mechanism from the lowermost member 22 to the uppermost member 24. (It will be understood that FIGURE 8 represents an exaggerated expanded view in that the first members 22 barely contact the second members 24 whereas in an operational unit more overlap is required.)

The mechanism 12 includes a central member or block 40 which is secured to the slider member 16 by the screws 42. There is also included a plurality of first members 44 and a plurality of second members 46. As best illustrated by the second member 46 shown in FIGURE 6, each of the first and second members 44 and 46 comprises a pair of legs 48 and a base portion 50 interconnecting the legs 48 to form a U shape. The first and second members 44 and 46 are disposed alternately within each other so that each of the first members 44 coacts with the two second members 46 which are disposed on each side thereof, and each of the second members 46 coacts with the two first members 44 which are disposed on each side thereof; that is, except for the central member 40 and the outermost member 46 which are the end or terminal members. In other words, the U-shaped members 44 and 46 fit one within another and the innermost U-shaped second member 46 is disposed about the central member 40. The legs 48 of the innermost U-shaped member 46 coact with the central member 40 and the legs of the outermost U-shaped member (which may be a second member 46, as shown, or a first member 44) coact with the legs of the U-shaped member within and next adjacent thereto, and each of the legs of all of the other members coact with one of the legs of the U-shaped member disposed therewithin and with one of the legs of the U-shaped members disposed thereabout.

There is also included means interconnecting the members 40, 44 and 46 for increasing the accumulated distance in a vertical direction across the members by increasing the distance between the base portions 50 of adjacent members upon relative movement in a horizontal direction of the innermost U-shaped members 46 relative to the central member 40. More specifically, this means includes a first connection means comprising the flanges 52 and coacting recesses 54 for allowing the first members 44 to move relative to one another in the vertical direction while preventing movement relative to one another in the horizontal direction, and a second connection means including the flanges 56 and coacting recesses 58 for allowing the second members 46 to move relative to one another in the vertical direction while preventing movement relative to one another in the horizontal direction. The flanges 52 and 56 and the recesses 54 and 58 are disposed vertically, and the central member 40 is operatively connected to the next adjacent first member 44 by two pair of flanges 52 and recesses 54.

The means interconnecting the members 40, 44 and 46 also includes coacting surfaces disposed between the opposing faces or sides of respective adjacent legs 48 so that each of the legs 48, except for the legs 48 of the outermost member, includes a surface on each side thereof for coacting with the surfaces on the next adjacent legs 48. The coacting surfaces are formed by a flange 60 on one side of each leg 48 and a groove 62 disposed on the other side of each leg 48 so that each flange 60 is disposed in a groove 62 in the next adjacent leg. As best illustrated in FIGURE 6, the coacting surfaces formed by the flanges 60 and grooves 62 on opposite sides of each leg 48 are disposed in a crossed relationship and the coacting surfaces on the inside of the legs 48 of each of the U-shaped members, whether they are flanges 60 or grooves 62, are parallel, and the coacting surfaces on the outside of the legs 48 of each U-shaped member, whether they are flanges 60 or grooves 62, are parallel. This is shown by the U-shaped member 46 illustrated in FIGURE 6 which has parallel flanges 60 on the inside of the legs 48 thereof and parallel grooves 62 on the outside of the legs 48 thereof.

The innermost U-shaped second member 46 includes an extending portion generally shown at 64 for supporting a drive mechanism which provides relative movement between the innermost U-shaped second member 46 and the central member 40, which movement in turn moves all of the second members 46 in unison because of the interconnection by the flanges 56 and recesses 58 while the first members 44 are prevented from moving relative to one another in a horizontal direction by the flanges 52 and recesses 54, thus increasing the distance between base portions 50 of adjacent U-shaped members in the vertical direction to increase the accumulated vertical distance across the entire mechanism 12, as illustrated in FIGURE 4. The central block member 40 has a threaded bore 66, and a threaded shaft 68 is disposed in threaded engagement with the bore 66 and is rotatably supported in the portion 64 of the innermost U-shaped member 46, as indicated at 70. A beveled gear 72 is secured to the end of the shaft 68 and is driven by a mating beveled gear 74 to rotate the shaft 68. The gear 74 is driven through a motion transmitting cable 76 by a motor 78. As the shaft 68 is rotated, therefore, the innermost U-shaped second member 46 moves horizontally and rectilinearly relative to the central member 40 to expand the mechanism 12 in the vertical direction. It will be noted that the threaded shaft 68 and threaded bore 66 apply a force between the innermost U-shaped second member 46 and the central member 40 which acts along a line which is parallel to the coacting surfaces formed by the flanges 60 and grooves 62 between the innermost U-shaped member 46 and the central member 40. That is to say, the axis of the threaded shaft 68 is parallel to the flanges 60 and grooves 62 coacting between the innermost U-shaped second member 46 and the central member 40.

The instant invention, therefore, sets forth a seat assembly including at least one mechanism 12 comprising a central member 40, a plurality of first members 44, and a plurality of second members 46 and each of the first and second members includes a pair of legs 48 and an interconnecting base portion 50 to form a U shape so that the U-shaped members are fitted one within another with the innermost U-shaped member 46 disposed about the central member 40. The members are interconnected by the flanges 52 and coacting recesses 54, the flanges 56 and coacting recesses 58, and the flanges 60 and coacting grooves 62 so that the distance between the base portions 50 of adjacent members is increased to increase the accumulated distance in a first direction across the mechanism 12 as the innermost U-shaped member 46 is moved in a second direction relative to the central member 40. The mechanism 12, therefore, is very compact when not expanded because its vertical height is defined by only one of the members, yet it has a very large range of vertical expansion. It will be understood that the mechanism of the instant invention may also be utilized in other environments.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A mechanism comprising: a plurality of first members, a plurality of second members, said first members being alternately disposed among said second members so that said first members are disposed in overlapping relationship with said second members, first connection means interconnecting said first members for moving all of said first members in unison to decrease the overlapping relationship thereof with said second members when one of said first members is moved in a second direction to decrease the overlapping relationship with the next adjacent second members, second connection means interconnecting said second members for moving all of said second members in unison to decrease the overlapping relationship thereof with said first members when said one of said first members is moved in said second direction to decrease the overlapping relationship with said next adjacent second members, and coacting surfaces disposed between next adjacent members with said coacting surfaces on opposite sides of each member being disposed in a crossed relationship so that each of said first members moves in said first direction relative to the next adjacent first members as said one of said first members is moved in said second direction and each of said second members moves in said first direction relative to the next adjacent second members as said one of said first members is moved in said second direction.

2. A mechanism comprising: a plurality of first members, a plurality of second members, first connection means for allowing said first members to move relative to one another in a first direction while preventing movement relative to one another in a second direction, second connection means for allowing said second members to move relative to one another in said first direction while preventing movement relative to one another in said second direction, said members disposed in side-by-side overlapping relationship with said first members alternately disposed between said second members, and coacting surface means interconnecting the sides of said members to next adjacent members for disposing said members in a first position where the distance in said first direction across said mechanism is defined by the extremities of one of said members and for increasing the distance in said first direction across said mechanism as said members are moved from said first position upon rectilinear movement in said second direction of one of said first members relative to at least one of said second members.

3. A mechanism comprising: a plurality of first members, a plurality of second members, and means preventing relative rotation between and interconnecting said members for increasing the accumulated distance in a first direction across said members upon movement in a second direction of one of said first members relative to at least one of said second members, said means including a first connection means for allowing said first members to move relative to one another in said first direction while preventing movement relative to one another in said second direction, and a second connection means for allowing said second members to move relative to one another in said first direction while preventing movement relative to one another in said second direction.

4. A mechanism as set forth in claim 3 wherein all of said members except the end members of said mechanism coact with a member on either side thereof, said members disposed alternately so that each of said first members coacts with two second members disposed on each side thereof and each of said second members coacts with two first members disposed on each side thereof.

5. A mechanism as set forth in claim 4 wherein said means includes coacting surfaces attached to and disposed between respective adjacent members so that each of said members has a surface on each side thereof for coacting with the surfaces on the next adjacent members.

6. A mechanism as set forth in claim 5 wherein said surfaces on opposite sides of each block are disposed in a crossed relationship.

7. A mechanism as set forth in claim 6 including drive means for providing relative movement in said second direction between one of said first members and one of said second members.

8. A mechanism as set forth in claim 7 wherein said drive means provides said relative movement by applying a force parallel to the coacting surfaces between the members interconnected by said drive means.

9. A mechanism as set forth in claim 6 wherein said coacting surfaces between members are formed by a flange on one member disposed in a groove in the next adjacent member.

10. A mechanism as set forth in claim 9 wherein said first connection means includes a flange and a coacting recess operatively interconnecting adjacent first members and said second connection means includes a flange and a coacting recess operatively interconnecting adjacent second members, said flanges and recesses being disposed in said first direction.

11. A mechanism comprising; a central member, a plurality of first members, a plurality of second members, each of said first and second members comprises a pair of legs and a base portion to form a U shape, said U-shaped members fitting one with another with the innermost U-shaped member disposed about said central member, and means interconnecting said members for increasing the distance between said base portions of adjacent members in a first direction as said innermost U-shaped member moves in a second direction relative to said central member.

12. A mechanism as set forth in claim 11 wherein said means includes a first connection means for allowing said first members to move relative to one another in said first direction while preventing movement relative to one another in said second direction.

13. A mechanism as set forth in claim 12 wherein said means includes a second connection means for allowing said second members to move relative to one another in said first direction while preventing movement relative to one another in said second direction.

14. A mechanism as set forth in claim 13 wherein said first members are alternately disposed within said second members, said legs of said innermost U-shaped member coacting with said central member and said legs of the outermost U-shaped member coacting with said legs of the U-shaped member within and next adjacent thereto, and each of said legs of all other members coacting with one of the legs of the U-shaped member disposed therewithin and with one of the legs of the U-shaped member disposed thereabout.

15. A mechanism as set forth in claim 14 wherein said means includes coacting surfaces attached to and disposed between respective adjacent legs so that each of said legs of said other members includes a surface on each side thereof for coacting with the surfaces on the next adjacent legs.

16. A mechanism as set forth in claim 15 wherein said surfaces on opposite sides of each of said legs are disposed in a crossed relationship and the surfaces on the inside of said legs of each U-shaped member are parallel and the surfaces on the outside of said legs of each U-shaped member are parallel.

17. A mechanism as set forth in claim 16 wherein said surfaces on the inside of said legs of said innermost U-shaped member coact with parallel surfaces disposed on each side of said central member.

18. A mechanism as set forth in claim 17 including drive means for providing relative movement in said second direction between one of said second U-shaped members and one of said central member and said first members.

19. A mechanism as set forth in claim 18 wherein said drive means provides said relative movement by applying a force which acts along a line which is parallel to the coacting surfaces between the members interconnected by said drive means.

20. A mechanism as set forth in claim 17 wherein said coacting surfaces between legs are formed by a flange on one leg disposed in a groove in the next adjacent leg.

21. A mechanism as set forth in claim 20 wherein said first connection means includes a flange and a coacting recess operatively interconnecting said legs of adjacent first members, said second connection means includes a flange and a coacting recess operatively interconnecting said legs of adjacent second members, said flanges and recesses being disposed in said first direction, said central member being operatively connected to one of said first members by said flanges and recesses and said innermost U-shaped member being one of said second U-shaped members.

References Cited

UNITED STATES PATENTS

| 580,922 | 4/1897 | Brower | 254—42 |
| 780,933 | 1/1905 | Brown | 108—147 |
| 2,099,107 | 11/1937 | Fleming | 254—42 X |

FOREIGN PATENTS

| 132,991 | 10/1919 | Great Britain. |

ROY D. FRAZIER, *Primary Examiner.*

R. P. SEITTER, *Assistant Examiner.*